(12) United States Patent
Takeuchi et al.

(10) Patent No.: US 7,711,569 B2
(45) Date of Patent: May 4, 2010

(54) CHAT INFORMATION SERVICE SYSTEM

(75) Inventors: Yohane Takeuchi, Saitama (JP); Atsushi Hoshino, Ibaraki (JP)

(73) Assignee: Honda Motor Co., Ltd., Tokyo (JP)

( * ) Notice: Subject to any disclaimer, the term of this patent is extended or adjusted under 35 U.S.C. 154(b) by 679 days.

(21) Appl. No.: 11/291,551

(22) Filed: Nov. 30, 2005

(65) Prior Publication Data

US 2006/0155765 A1     Jul. 13, 2006

Related U.S. Application Data

(60) Provisional application No. 60/632,752, filed on Dec. 1, 2004.

(51) Int. Cl.
*G06F 17/20* (2006.01)
*G06F 3/16* (2006.01)
*G06F 7/00* (2006.01)
*G10L 11/00* (2006.01)
*G10L 15/22* (2006.01)
*G10L 21/06* (2006.01)

(52) U.S. Cl. .......................... 704/275; 704/1; 704/270; 704/270.1; 709/202; 715/727

(58) Field of Classification Search ................. 704/231, 704/251, 270, 272, 275, 270.1, 1; 345/901; 709/202; 715/727
See application file for complete search history.

(56) References Cited

U.S. PATENT DOCUMENTS 5,924,068 A * 7/1999 Richard et al. ............... 704/260
6,629,087 B1 * 9/2003 Benson et al. ................ 706/11
6,721,706 B1 * 4/2004 Strubbe et al. .............. 704/275
6,728,679 B1 * 4/2004 Strubbe et al. ............ 704/270.1

(Continued)

FOREIGN PATENT DOCUMENTS

| JP | 2002-326173 | 11/2002 |
|---|---|---|
| JP | 2004-299025 | 10/2004 |

OTHER PUBLICATIONS

Sung-Min Lee; Tai-Yun Kim, "A news on demand service system based on robot agent," Parallel and Distributed Systems, 1998. Proceedings., 1998 International Conference on , vol., no., pp. 528-532, Dec. 14-16, 1998.*

(Continued)

*Primary Examiner*—Talivaldis I Smits
*Assistant Examiner*—Matthew H Baker
(74) *Attorney, Agent, or Firm*—Fenwick & West LLP

(57) ABSTRACT

The present invention provides a chat information system having a voice recognition device for recognizing voices, a voice synthesizer, a humanoid robot, a microphone for receiving the voices and a speaker for pronouncing synthesized voices. The system comprises a headline sensor capturing news from the Internet, a news database for storing the captured news, and a conversation database including at least a general conversation database storing a set of inquiries and responses. The system also includes a chat engine configured to extract one or more keywords from a user's speech that has been recognized by the voice recognition device, to search at least one of the news database and the conversation database with the extracted keywords and to output via the speaker the contents that have been hit by the search.

12 Claims, 9 Drawing Sheets

U.S. PATENT DOCUMENTS

| | | | |
|---|---|---|---|
| 6,731,307 B1 * | 5/2004 | Strubbe et al. | 715/727 |
| 6,795,808 B1 * | 9/2004 | Strubbe et al. | 704/275 |
| 7,277,854 B2 * | 10/2007 | Bennett et al. | 704/257 |
| 7,403,938 B2 * | 7/2008 | Harrison et al. | 707/3 |
| 7,505,892 B2 * | 3/2009 | Foderaro | 704/1 |
| 7,624,007 B2 * | 11/2009 | Bennett | 704/9 |
| 2004/0143369 A1 | 7/2004 | Takenaka et al. | |
| 2004/0199292 A1 | 10/2004 | Sakagami et al. | |
| 2005/0043956 A1 * | 2/2005 | Aoyama et al. | 704/276 |
| 2006/0069546 A1 * | 3/2006 | Rosser et al. | 704/9 |
| 2006/0155765 A1 * | 7/2006 | Takeuchi et al. | 707/104.1 |
| 2007/0101313 A1 * | 5/2007 | Bodin et al. | 717/114 |

OTHER PUBLICATIONS

H. Lucke, H. Honda, K. Minamino, A. Hiroe, H. Mori, H. Ogawa, Y. Asano, H. Kishi, Development of a Spontaneous Speech Recognition Engine for an Entertainment Robot , 2003, ISCA & IEEE Workshop on Spontaneous Speech Processing and Recognition, Apr. 13-16, 2003.*

Nakano, Mikio et al., "A Two-Layer Model for Behavior and Dialogue Planning in Conversational Service Robots," Proceedings of the 2005 IEEE/RSJ International Conference on Intelligent Robots and Systems, Mar. 2005.

* cited by examiner

FIG. 2B

General Conversation Database 15a

| Contens | User Script | Response Script | Reserved Chat Flag | Script Designating Varialbe Y1 | Prior Priority | Variation of Priority | Current Priority |
|---|---|---|---|---|---|---|---|
| D1 | You/ Length | I am 120 cm tall. | 1 | D2 | 100 | 0 | 100 |
| D2 | You/ Weight | I weigh 50 kg. | 1 | D4 | 95 | 0 | 95 |
| D3 | You/ Speciality | My speciality is dancing. | 0 | ... | 90 | 0 | 90 |
| D4 | You/ Hometown | My hometown is Tokyo. | 1 | D5 | 85 | 0 | 85 |
| D5 | You/ Birthday | My birthday is October 31. | 1 | D8 | 80 | 0 | 80 |
| D6 | Hello | Hello. | 0 | ... | 75 | 0 | 75 |
| D7 | Good-morning | Good morning. | 0 | ... | 70 | 0 | 70 |
| D8 | You/ Name | My name is ASIMO. | 1 | D1 | 65 | 0 | 65 |
| D9 | You | What? | 0 | ... | 60 | 0 | 60 |
| D10 | You | What can I do for you? | 0 | ... | 55 | 0 | 55 |
| ... | ... | ... | ... | ... | ... | ... | ... |
| ... | ... | ... | ... | ... | ... | ... | ... |

FIG. 2C

General Conversation Database 15a

| Contents | User Script | Response Script | Reserved Chat Flag | Script Designating Variable Y1 | Prior Priority | Variation of Priority | Current Priority |
|---|---|---|---|---|---|---|---|
| D1 | You/Length | I am 120 cm tall. | 1 | D2 | 100 | -30 | 70 |
| D2 | You/Weight | I weigh 50 kg. | 1 | D4 | 95 | +10 | 105 |
| D3 | You/Speicality | My speciality is dancing. | 0 | ... | 90 | +10 | 100 |
| D4 | You/Hometown | My hometown is Tokyo. | 1 | D5 | 85 | +10 | 95 |
| D5 | You/Birthday | My birthday is October 31. | 1 | D8 | 80 | +10 | 90 |
| D6 | Hello | Hello. | 0 | ... | 75 | +10 | 85 |
| D7 | Good-morning | Good morning. | 0 | ... | 70 | +10 | 80 |
| D8 | You/Name | My name is ASIMO. | 1 | D1 | 65 | +10 | 75 |
| D9 | You | What? | 0 | ... | 60 | +10 | 70 |
| D10 | You | What can I do for you? | 0 | ... | 55 | +10 | 65 |
| ... | ... | ... | ... | ... | ... | ... | ... |
| ... | ... | ... | ... | ... | ... | ... | ... |

FIG. 2D

News Database 13

| News | Title | Contens | Prior Priority (Variable) | Individual Variation of Priority | Total Variation of Priority | Current Priority |
|---|---|---|---|---|---|---|
| N1 | Today's Weather | ········· | 100 | 0 | −5 | 95 |
| N2 | New Products | ········· | 95 | 0 | −5 | 90 |
| N3 | Today's Stock Price | ········· | 90 | 0 | −5 | 85 |
| N4 | Diplomacy | ········· | 85 | 0 | −5 | 80 |
| N5 | High-Technology | ········· | 80 | 0 | −5 | 75 |
| N6 | Travel Guid | ········· | 75 | 0 | −5 | 70 |
| ... | ... | ... | ... | ... | ... | ... |
| ... | ... | ... | ... | ... | ... | ... |

FIG. 2E

News Database 13

| News | Title | Content | Prior Priority (Varuiable) | Individual Variation of Priority | Total Variation of Priority | Current Priority |
|---|---|---|---|---|---|---|
| N1 | Today's Weather | ……… | 100 | -30 | -10 | 60 |
| N2 | New Products | ……… | 95 | +1 | -10 | 86 |
| N3 | Today's Stock Price | ……… | 90 | +1 | -10 | 81 |
| N4 | Diplomacy | ……… | 85 | +1 | -10 | 76 |
| N5 | High-Technology | ……… | 80 | +1 | -10 | 71 |
| N6 | Travel Guide | ……… | 75 | +1 | -10 | 66 |
| ... | ... | ... | ... | ... | ... | ... |
| ... | ... | ... | ... | ... | ... | ... |

CHAT INFORMATION SERVICE SYSTEM

RELATED APPLICATION

This application claims the benefit of provisional Application Ser. No. 60/632,752 filed on Dec. 1, 2004 by Yohane Takeuchi et al, the subject matter of which is incorporated herein in the entirety by this reference thereto.

FIELD OF THE INVENTION

The present invention relates to a chat information system using a humanoid robot.

BACKGROUND OF THE INVENTION

The following schemes are known in the art for carrying out a daily conversation between a system and a person.

The first one is a task oriented system for having a robot carry out a specific task, as discussed in "Nakano". A simple system in this category is one that makes a robot produce a predetermined response in response to an oral command. For example, to a user's speech (command) "Tell me today's weather", a robot responds by orally telling the day's weather forecast. Generally, commands and responses such as this are uniquely defined.

In a sophisticated chat system, a robot carries out a predetermined action after exchanging chat with a user, as discussed in Nakano, identified below. This type of chat systems utilize oral chat technology. A characteristic part of this type of chat system is that the robot carries out a task involving a movement or an action such as to move to call for a designated person.

Another scheme is called a chat system, an example being "Valerie". A user may enjoy conversation with a robot rather than having the robot to carry out tasks. This system utilizes a known chatbot system. A chatbot (chat robot) may give a user a feeling that the user is talking with a person by having the robot perform gestures in the real space.

The chatbot system is a system for carrying out a daily conversation with a user. As discussed in "Akiyama", predetermined chat patterns are stored in a database, which is searched responsive to chat input from the user for producing a system response. For example, when a user enters with a keyboard or a microphone "What do you like?", the system searches response data which meets the word sequence of what-do-you-like-?. A large number of possible user speech entries and system responses thereto are stored in the database. The chat system searches the database and retrieves a response for presenting it to the user through a speaker or a monitor display. The system response may be designed to incorporate a portion of user speech entry into the response.

For example, when a user enters "I was scolded by Dad, yesterday" with a keyboard or a microphone, the chat system may return "What is 'Dad' to you?". This response is produced by inserting a word used by the user into the ' . . . ' part of a response template "What is ' . . . ' to you?", which has been stored in the database.

In any event, the chatbot system is a system that stores a sort of inquiries and answers into a database for producing system responses to user entries.

Prior Art References

1. [Nakano] M. Nakano, Y. Hasegawa, K. Nakadai, T. Nakamura, J. Takeuchi, T. Torii, H. Tsujino, N. Kanda, H. G. Okuno, "A two-layer model for behavior and dialogue planning in conversational service robots," in Proc. IROS-2005. 2005.

2. [Valerie] Valerie Web Site: http://www.roboceptionist.com/

3. [Akiyama] Tomotoshi Akiyama, "A program in love ~ a chatbot made with Ruby" Mainichi Communications, 2005.

In order to make robots, particularly humanoid robots diffuse in the society, robots need to be friendly so that users may use them without having a feeling of congruity. The character and performance of a chat system to be incorporated into the robot are important factors in this respect. The prior art as described above have the following shortcomings.

It is possible to prepare a chat database for a short time usage. However, a large and complicated database would be needed to cope with various situations taking place in daily use of the robot in a long period of time. Such a database can hardly be established beforehand. Further, the scheme of producing a response by extracting a keyword from the user's speech and by inserting the keyword into a predetermined template would hardly develop new chat contents. The chat system short of development possibility is not satisfactory from the standpoint of developing and continuing natural conversation with users.

One way to resolve the above identified problems is to incorporate external information at appropriate timing and present it to the user in conversation. However, mere use of a known information retrieval system that searches information designated by the user and present it to the user is not satisfactory for development and continuing of a natural conversation because, in such a system, the user needs to take a positive action for "requesting or searching information". This is because the prior art system is a passive system. With such a prior art system, the user will be bored and feel a stress, and will not use the system in a daily life for a long period of time.

Accordingly, it is an object of the present invention to provide a chat information system capable of developing and continuing a natural conversation with a user.

SUMMARY OF THE INVENTION

The present invention provides a chat information system having a voice recognition device for recognizing voices, a voice synthesizer, a humanoid robot, a microphone for receiving the voices and a speaker for pronouncing synthesized voices. The system comprises news capturing means for capturing news from the Internet, a news database for storing the captured news, and a conversation database including at least a general conversation database storing a set of inquiries and responses. The system also includes a chat engine configured to extract one or more keywords from a user's speech that has been recognized by the voice recognition device, to search at least one of the news database and the conversation database with the extracted keywords and to output via the speaker the contents that have been hit by the search.

According to the invention, since the contents which the humanoid robot can talk about are frequently updated, the topics can be enriched.

In one embodiment of the invention, the conversation database includes a random chat database. The conversation database may also include a word conversion database.

In another embodiment of the invention, the contents of the news database and the conversation database are assigned with priorities, and the chat engine includes priority changing means for lowering the priority of the content that has been hit by the search and has been output as a response relative to the other contents.

According to one aspect of the invention, the chat engine searches at least one of said news database and the conversation database with a plurality of words included in a user's speech, and when a plurality of contents are hit, selects and outputs one of the contents based on matching degree of the contents with the plurality of words and on the priorities assigned to the contents.

According to another aspect of the invention, the news capturing means includes a headline sensor capturing most recent news at a predetermined time interval, and the news database is updated with its contents based on input from the headline sensor.

According to yet another aspect of the invention, the chat engine is configured to analyze the scripts of the content that is to be passed to the voice synthesizer, and to set a reserved chat flag when the script belongs to one of a plurality of predetermined chat patterns.

In one embodiment of the invention, when the reserved chat flag is set, the chat engine outputs a response according to the chat pattern responsive to a user's speech.

BRIEF DESCRIPTION OF THE DRAWINGS

FIG. 2b illustrates an example of the structure of the general conversation database 15a.

FIG. 2c illustrates a manner priority data are updated in the general conversation database 15a.

FIG. 2d illustrates an example of the structure of the news database 13.

FIG. 2e illustrates another example of the structure of the news database.

DESCRIPTION OF THE PREFERRED EMBODIMENTS

Figure 1A:
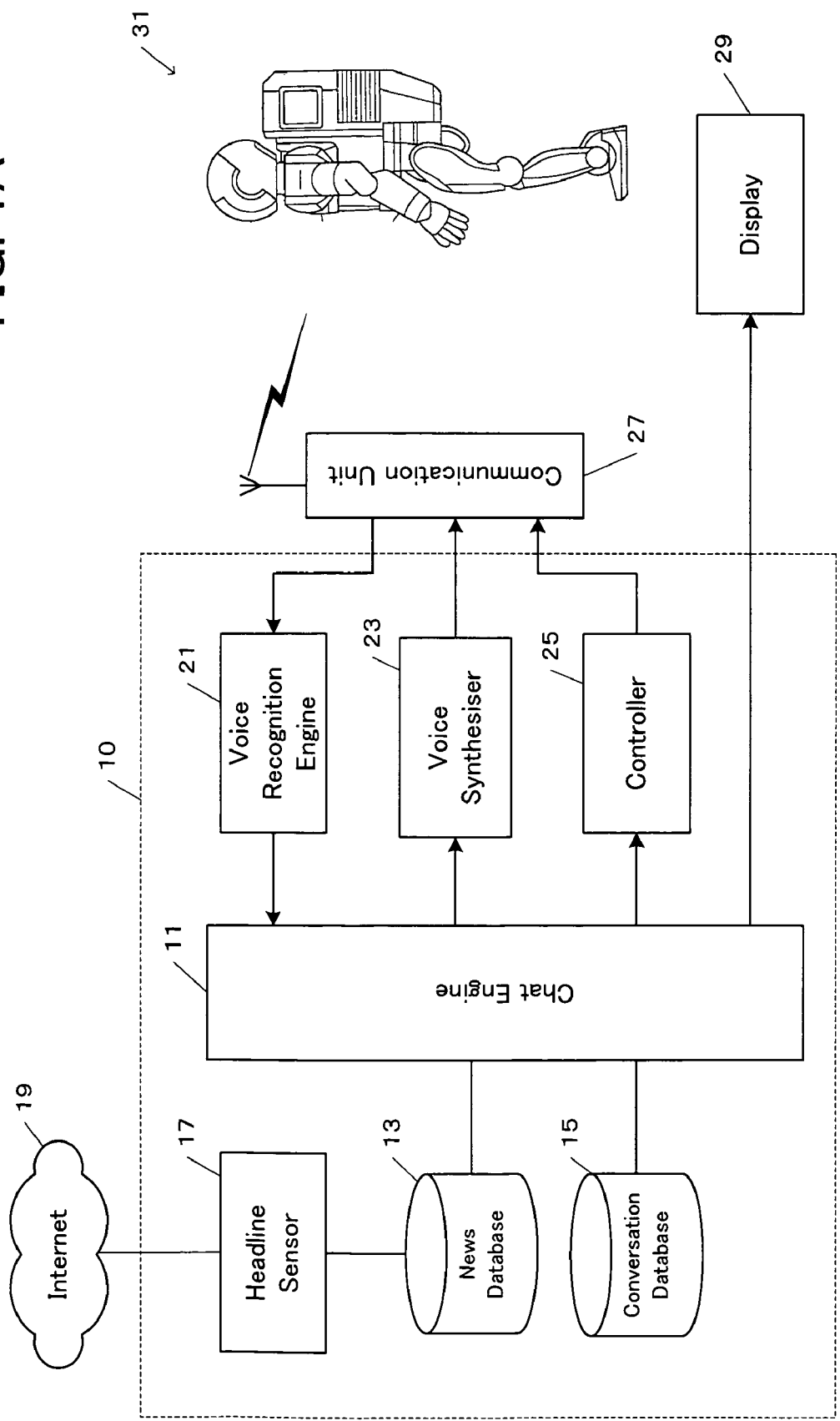
FIG. 1a is a block diagram of an overall structure of a system in accordance with the present invention.
Figure 1B:
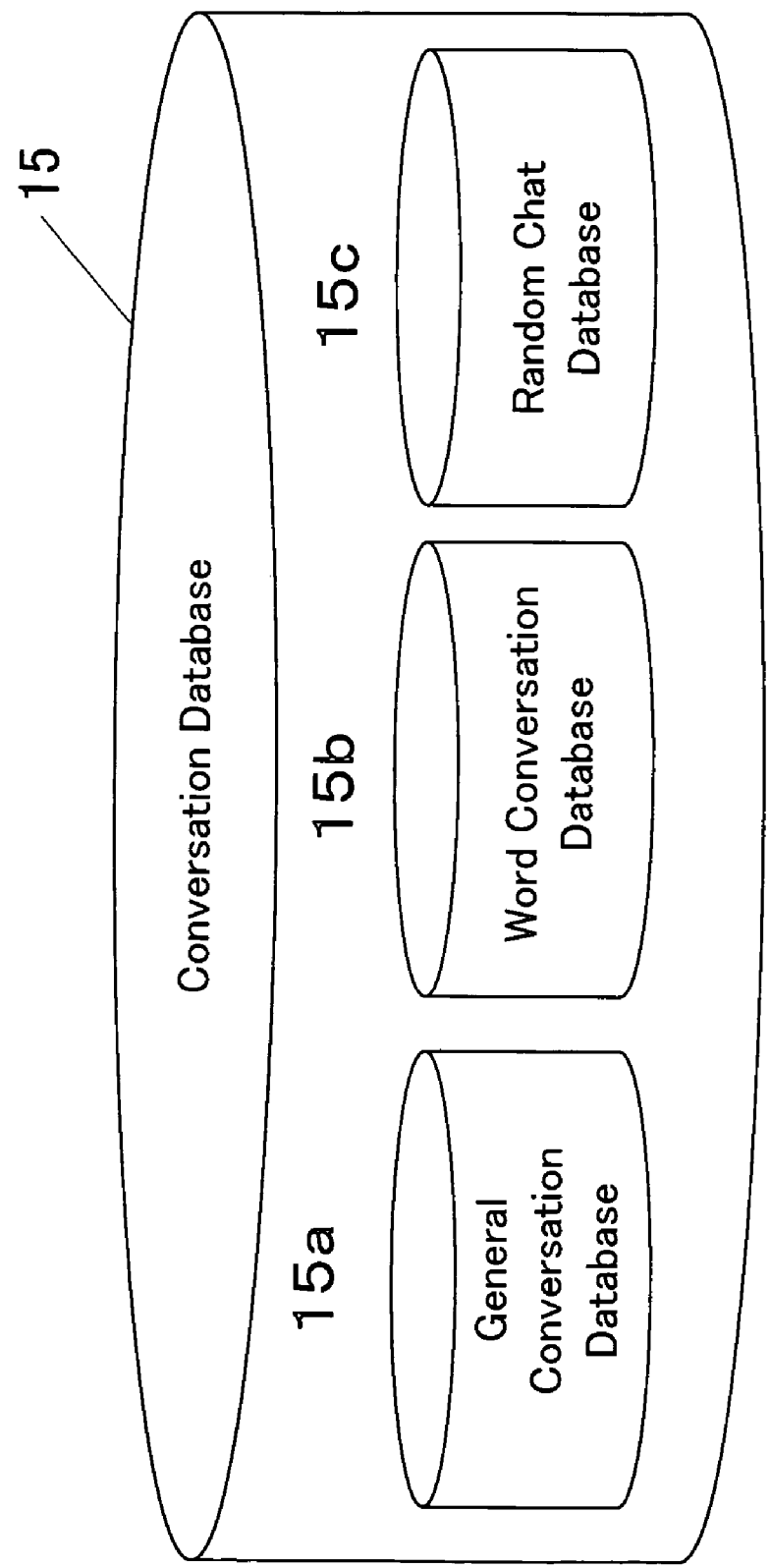
FIG. 1b illustrates chat database 15.

One preferred embodiment of the present invention will be described below with reference to the accompanying drawings. FIG. 1 is a block diagram illustrating an overall structure of a chat information system in accordance with one embodiment of the present invention. Fundamental components of this system are a computer 10 and a humanoid robot 31. The computer 10 can be configured from, for example, a general-purpose work station or a personal computer. The humanoid robot is, for example, a twin-legged robot "ASIMO" that has been developed and disclosed by the assignee of the present invention.

Technology for controlling a twin-legged robot is disclosed in Japanese Patent Application Publication Nos. 2002-326173 and 2004-299025, both assigned to the same assignee as the present application. The computer 10 is connected to a communication unit (transceiver) 27 for radio communication with the humanoid robot.

The computer 10 includes a chat engine 11 to be used for making a dialog with a user through the robot 31. User's oral speech is converted into an electric signal through a microphone that is provided in the robot 31. This electric signal is transmitted from the communication unit provided in the robot 31 to the computer 10. The robot 31 is provided with a microphone and a communication unit, which are not shown in FIG. 1a. The microphone for capturing user's oral speech may be disposed near the mouth of a user instead of in the robot 31 or in addition to the one provided to the robot 31.

A communication unit 27 that is provided in the computer 10 receives electric signal from the robot 31 and passes it to a voice recognition engine 21. The voice recognition engine 21 converts this electric signal into text data. The voice recognition engine 21 may be configured based on a known voice recognition program such as IBM "Via Voice (trademark)" or its revised version.

The computer 10 is also connected to the Internet 19 and searches web sites on the Internet 19 in a predetermined time interval (for example, every four or five hours) to collect news articles by a headline sensor 17. The headline sensor 17 is a software product for obtaining text data and binary data periodically from the sites on the Internet for updating the news data in the database 13. It is sometimes referred to as an RSS (Rich Site Summary) reader. The RSS is a XML-based format for structuring and describing meta-data such as headlines and/or summaries of the web sites and is mainly used for publishing update information of the sites. Document described with the RSS includes a title, address, headline, summary, time of update and so on for each page of a web site. Many of the news sites publish their update information in a form of RSS. An antenna software for retrieving the RSS information from a specified site has been developed.

The RSS data collected by the headline sensor 17 are stored in a news database 13. The news database 13 is typically stored in a hard disk device. The database 13 can be searched with a search program using keywords.

The computer 10 is provided with a conversation database 15, which stores a collection of "inquiries" and "responses" for general conversations. The database 15 also stores commands for instructing the robot to perform gestures in association with these "inquiries" and "responses".

The chat engine 11 analyzes the text data delivered from the voice recognition engine, searches either or both of the news data base 13 and the conversation database 15 in accordance with the content of the received text data and selects the content that is appropriate for the response. Then, the text data of such selected content is delivered to a voice synthesizer 23, in which the text data are converted into voice signals. The voice synthesizer 23 may be configured by a known software program, for example, FineVoice (trademark) of NTT corporation. The voice signals generated by the voice synthesizer 23 and/or the control signals for instructing the behaviors of the robot are transmitted to the robot 31 through the communication unit 27.

The robot 31 receives these voice signals and/or control signals and speak through a speaker (not shown) provided in the robot 31 and/or perform a gesture or action in accordance with the control signal.

The chat engine 11 has the function of a display server which sends the contents obtained from the database to a display device 29 for presenting the contents on the display device 29. When news to be presented to the user is larger than a predetermined volume or when the contents include images, the contents are displayed on the display device 29. The display device 29 may be a projector for projecting contents on a screen by using an optical system, a display unit used with the computer 10 or a television unit.

The chat database 15 may include a general conversation database 15a, word conversion database 15b and random chat database 15c, details of which are to be described hereafter.

Figure 2A:
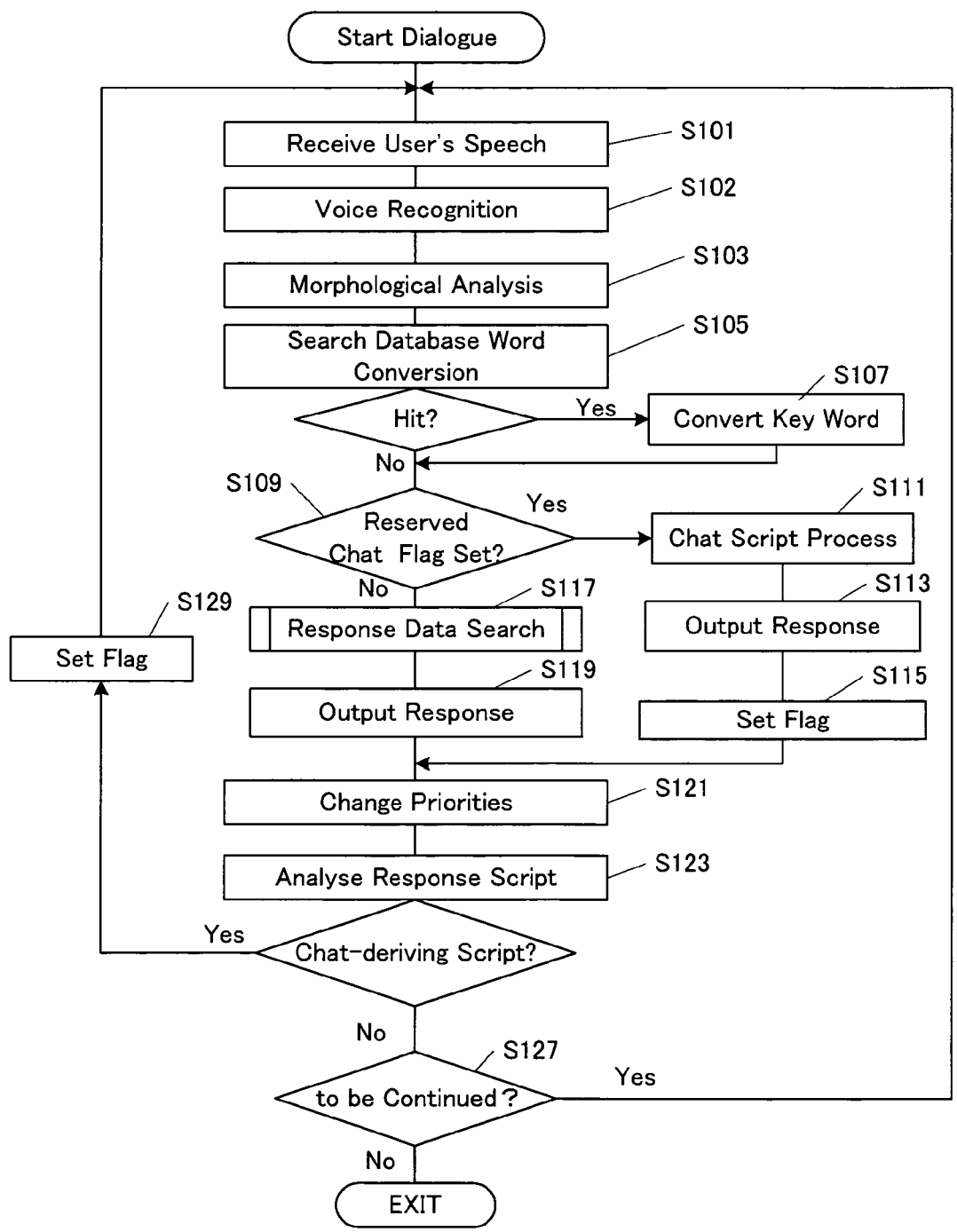
FIG. 2a is a flowchart of a process in accordance with one embodiment of the present invention.

Now, an overall process of a system in accordance with one embodiment of the present invention will be described with reference to FIG. 2a. FIG. 2a illustrates processes that are performed by the chat engine 11.

When the user talks to the robot 31, the user's voice is converted into electric signals by the microphone. The electric signals are transmitted wirelessly from the communication device of the robot 31 and received by the communication unit 27 of the computer 10 (S101). The received electric signals of the voice are delivered to the voice recognition engine 21, converted into the text data (S102) by the voice recognition engine 21 and then provided to the chat engine 11.

The chat engine 11 carries out a morphological analysis upon the received text data to parse the conversation text into words or word classes (S103). For example, a sentence is parsed into "it", "is", "fine", "today", "is'nt it". Various morphological analysis programs are available in the art. Detailed discussion of the morphological analysis is omitted here as it is not a part of the present invention.

In one embodiment of the present invention, the chat engine 11 searches the word conversion database 15b with regard to the words obtained from the morphological analysis to convert predetermined synonyms into a single common word. For example, Japanese words "watashi", "boku" and "ore", all meaning "I" are converted to "watashi". Thus, when a user pronounces "boku", the system searches the word conversion database with the keyword "boku" (S105) and converts it into the common word "watashi" (S107). The conversion into a common word simplifies the structure of the chat database 15 and enhances efficiency of the search.

Then, the process proceeds to step S109, in which it is determined whether or not a reserved chat flag has been set. As to be discussed hereinafter, the reserved chat flag is provided to produce predetermined responses. The chat engine has two variables X1 and Y1. The variable X1 relates to the reserved chat flag and the variable Y1 a script designating variable, which is to be described hereafter.

When, in step S109, the variable X1 is "1", that is the flag has been set, the process proceeds to step S111. When the variable X1 is "0" in step S109, that is, the reserved chat flag has not been set, a subroutine of step S117 and response output process of step S119 are performed, which are to be described hereafter.

FIG. 2b illustrate an example of data in the general conversation database 15a, which includes the fields of "user script", "response script", "reserved chat flag information", "script designating variable", "prior priority", "variation of priority" and "current priority". In FIG. 2b, the field of "gesture command information" is omitted for simplicity. As can be seen in FIG. 2b, at this stage, content D1 has the highest "current priority" of 100, which equals to "100" at the "prior priority" field minus "0" at the "variation of priority" field.

When, in step S109, the reserved chat flag is found to have been set to 1, the response script contained in the content designated by the script designating variable Y1 of the chat engine 11 is identified (S111). In the example shown in FIG. 2b, variable Y1 designate content D2. The "response script" corresponding to the content D2, "My weight is 50 kg" is output to the synthesizer 23 and the communication unit 27 for transmission to the robot 31 for oral output (S113). Some response scripts in the general conversation database 15a are associated with gestures to be performed by the robot 31 when the response scripts are output.

The variable X1 relating to the reserved chat flag is reset to "0" and the value of the script designating variable Y1 is cancelled (S115). The above described steps of S111, S113 and S115 are performed relative to the general conversation database 15a. As to be described hereafter, when a response output is produced from the news database 13 and the reserved chat flag is set to "1" in step S129, a predetermined response "Do you want to learn more?" is output.

When the processes of steps S119 and S115 are done, priority data are updated (S121). FIGS. 2d and 2e illustrate an example of records stored in the news database 13. The news database 13 stores a plurality of news captured by the headline sensor 17 at a predetermined time interval, each one of the news being stored as a record comprising the fields of "title", "content of the news (text and images)", "prior priority (variable)", "individual variation of priority", "total variation of priority", and "current priority". In the example shown in FIG. 2d, news N1 has the highest priority at this stage as its "current priority" is 95, produced by the following calculation.

$$100(\text{prior priority}) - 0(\text{individual variation}) - 5(\text{total variation}) = 95$$

When news N1 shown in FIG. 2d is output at step S119, the "individual variation of priority" is decreased by "30", and the "individual variation of priority" values for the other news are increased by "1". Concurrently, the "total variation of priority" for all the news is decreased by "5" from the present value of "−5", resulting in the value of "−10". The result is shown in FIG. 2e. As can be seen from FIG. 2e, news N2 has obtained the highest priority.

When content D1 as shown in FIG. 2b is output at step S119, the "variation of priority" for content D1 is decreased by thirty, and "variation of priority" fields of the other contents are increased by "10", resulting in the database records as shown in FIG. 2c. Content D2 has obtained the highest priority at this stage.

At step S121, both the general conversation database 15a and the news database 13 are updated. When a response is output from the general conversation database immediately before step S121, the priority of the output content is decreased by "30" and those of the other contents are respectively increased by "10". Concurrently, the individual variation of priority for each of all the news in the news database 13 is increased by "1", and the total variation of priority is increased by "5" to produce the current priority.

On the other hand, when a response is output from the news database immediately before step S121, the individual variation of priority for the output news is decreased by "30", and those of the other news are increased by "1". Concurrently, the total variation of priority for all the news is decreased by "5" to produce the current priority.

Likewise, every time the process of step S121 is carried out, priorities in the general conversation database 15a and news database 13 are flexibly changed so that repetition of the same response output is avoided, which otherwise would produce boring conversation. Further, when a response is output from the news database 13, priority of all the news is decreased, for example, by five in the present embodiment, repetition of outputting news is avoided. The news database 13 is updated at a predetermined time interval (for example, every four or five hours), and most recently captured news may be output through response data retrieval and outputting process S117 and S119 to be described hereafter, which would produce a sort of surprise in the conversation between the user and the robot, thus enhancing the conversation.

The above mentioned variation values of "−30", "+10", "+1" and "−5" may take other values. For example, the highest value of the "individual variation of priority" in FIG. 2e may be set to "0", and with respect to the content that has been output, "−30" is added to the "priority variation". The "priority variation" for all the other contents and the "individual variance of priority" for the news are added with "+1" with "0" being the upper limit. With these changes in priority, new "current priority" is calculated. By selecting the variation values, variation and sequence of conversation contents may be adjusted.

In step S123, determination is made as to from which database the response has been output in the preceding step S119. When it is determined that, in step S119, a response has been output from the news database, the variable X1 of the chat engine 11 is set to "1" in step S123. When it is determined that, in step S119, a response has been output from the general conversation database 15a, the general conversation database 15a is checked to see if the reserved chat flag is "1" or "0". For example, when content D1 is output in step S119, the reserved chat flag "1" of the content D1 is checked (FIG. 2b) and the variable X1 is set to "1" (S129). Concurrently, the script designating variable Y1 is set to D2.

When the process returns to S101 from S127 and when there is no user speech, the process moves to step S109. Though the process has been described that the process moves from step S123 to step S127, the same process as the one performed when a response is output from the general conversation database 15a at step S119 may be performed in step S123. In this embodiment, when another user speech is received before a response produced in step S119 or S115 is output, the reserved chat may be skipped after the response produced in step S119 or S115 is output, thereby entering into step S102 relative to the most recently received user speech. In this manner, incoherent conversation may be avoided.

Figure 3:
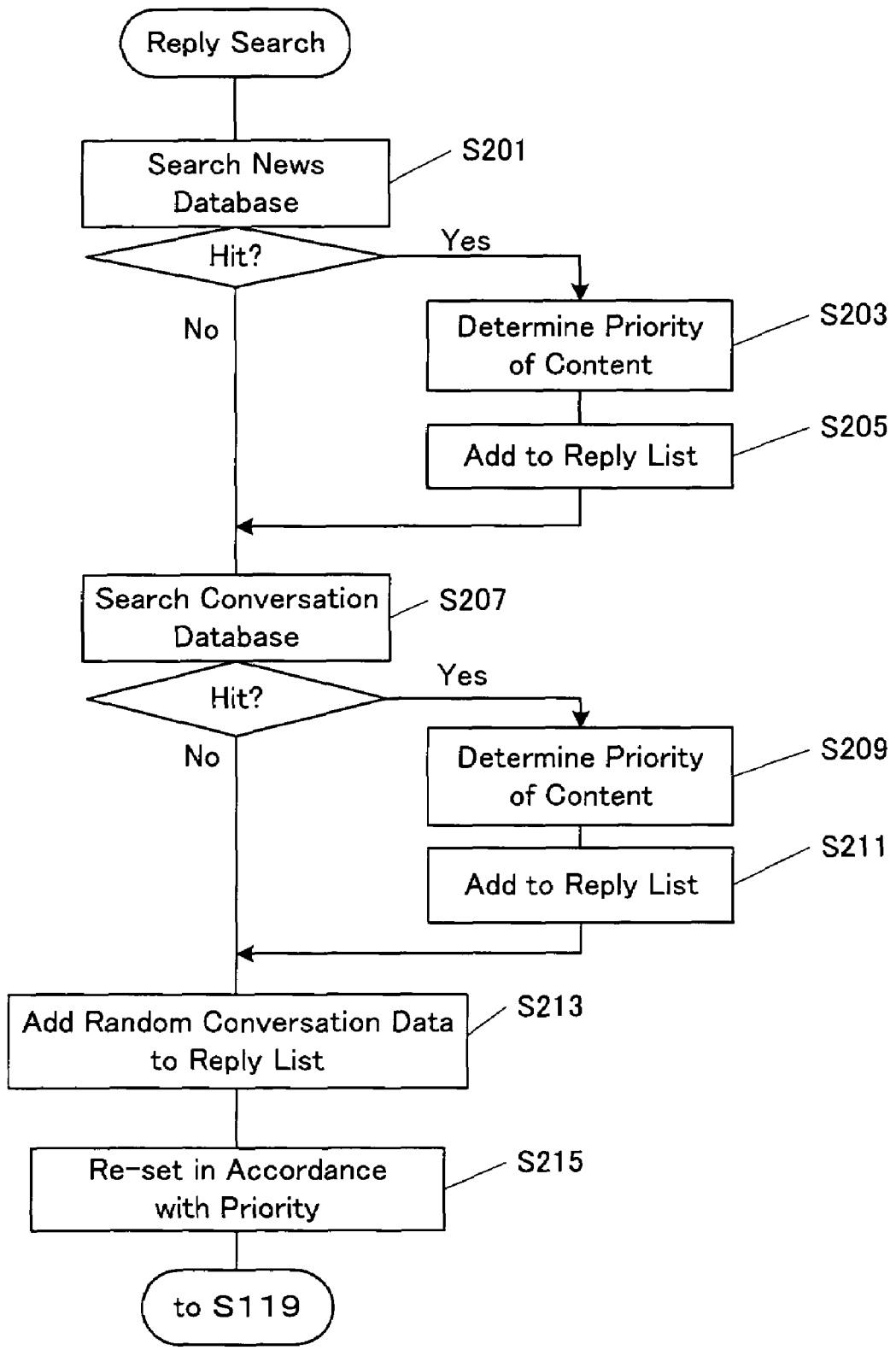
FIG. 3 is a flowchart of a subroutine for searching response contents.

Now, referring to FIG. 3, the subroutines of steps S117 and S119 are described. After the morphological analysis (S103) and searching of the word conversion database (S105) are done, the news database 13 is searched using the words from the user speech as one or more keywords (S201). "Nouns" and "pronouns" contained in the user speech may be extracted and used as keywords. For example, when a user speaks, "Today's weather is fine, isn't it", the news database may be searched with keywords of "today" and "weather". When the search hits a plurality of news, priority of the news is compared to choose the news with the highest priority (S203). When there are no hits, a search will be made with a single keyword of "today" followed by another search with a keyword of "weather". Out of a plurality of hits, the news having the highest priority is selected (S203). This way, nouns and pronouns included in the user speech are used in combination first to search the news that matches best with keywords. In addition to nouns and pronouns, adjectives and verbs may also used as keywords.

Referring to FIG. 2d, when a user says "Today's weather is fine, isn't it", news N1 is selected. When the user speak "Tell me today's news", news N1 and N3 are hit and news N1 with higher priority is selected. The news selected in step S203 is temporarily stored in a response list of the chat engine 11 (S205). When there are no news to be selected, no news are stored in the response list.

Subsequently, a similar process is carried out relative to the general conversation database 15a (steps S207-S211). When the user asks "What is your height?", the "user script" field of the database 15a as illustrated in FIG. 2b is searched with the keywords of "you" and "height", and content D1 is selected. When the user asks "Who are you?", the database is searched with the keywords of "you" and "who", and contents D1, D2, D3, D4, D5, D8, D9 and D10 are hit. With the priority comparison process (S209), content D1 is selected. The selected content is temporarily stored in the response list of the chat engine 11 (S211). When there are no hits, no contents are stored in the response list.

The process now proceeds to step S213, in which a response is randomly selected from the random chat database 15c and is added to the response list. The random chat database 15c includes a plurality of chat scripts that may be used when no responses are selected from the general conversation database 15c or the news database 13. Such chat scripts are given a relatively low priority value, for example, a fixed value of sixty. The priority value may be changed according to the degree of non-continuity, development and surprise to be introduced in the chat. Some examples of the chat scripts are, "What's new?", "Let's change the subject", "I do not understand", "right!", "Can you say it again?", "I want to go outside", "I see", and "Do you like to watch some news?".

In step S215, one news selected from news database, one response script selected from the general conversation database and one chat script selected from the random chat database are compared in terms of their priority, and the content having the highest priority is output as a response (FIG. 2a, S119). When a plurality of contents with the same priority are hit, one of them is randomly selected. When a news is selected from the news database 13 and is to be output, its title may be vocally output. When a response is output from the random chat database 15c, the process in step S121 changes priority values as follows. For all the contents in the general conversation database 15a, the priority values are increased by ten, for all the news in the news database 13, the individual variance value is increased by one and the total variance is decreased by five. When a response is output from the random chat database 15c, no specific process is performed in step S123 and the process moves to step S127 for determining continuation of the conversation.

The robot 31 has an imaging device that corresponds to human eyes so that the robot 31 can recognize the user. When the user is near the robot 31, the robot 31 assumes that the conversation may continue (S127) and enters into a state of waiting for user's speech (S101). When the user moves away from the robot, the robot assumes that the conversation has been completed and terminates the chat mode. On and off of the present system may be done with a switch or by an oral command.

Figure 4:
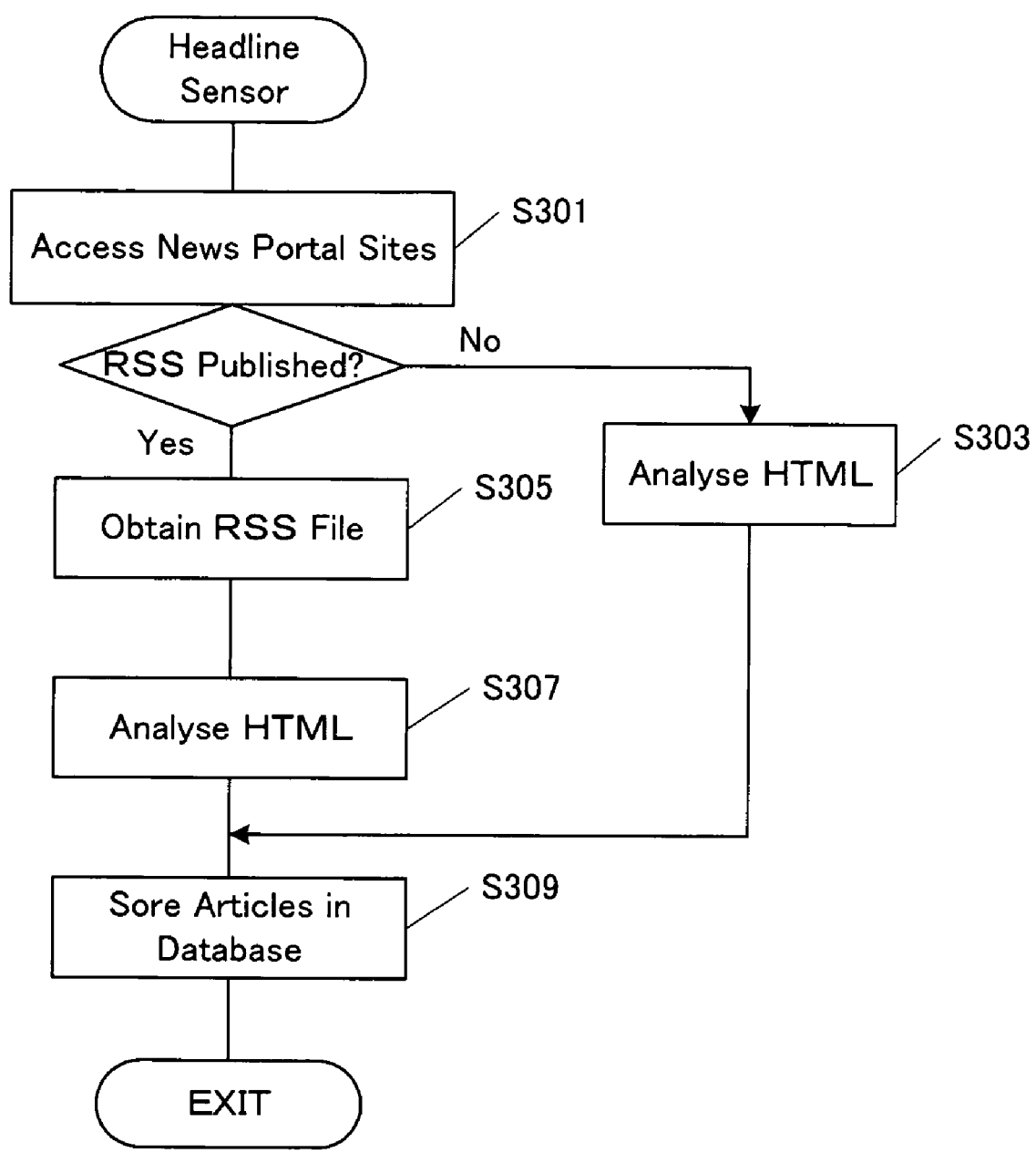
FIG. 4 is a flowchart of a process performed by a headline sensor.

FIG. 4 illustrates a flowchart of a process performed by the headline sensor 17. The sensor 17 periodically accesses pre-selected news portal sites and captures the RSS from the sites where the RSS is published (S305). As for the sites that do not publish the RSS, the sensor 17 extracts HTML documents and analyzes the documents to obtain text data (S303). The HTML documents contained in the captured RSS are analyzed to extract the text data. Such extracted text data are stored in the news database 13 (S309).

As news are captured, each news article is given a priority and is subsequently stored in the news database 13. The newer the news is, a higher priority value is given to the news. For example, the highest priority is given a value of "100" and each news is assigned with a priority which sequentially decreases by "5" or "1" from the highest priority. In the case the headline sensor 17 captures a predetermined amount of or a predetermined number of the titles of most recent news at a time interval of four to five hours, the news database 13 preferably has a capacity of storing news to be captured in fifty capturing cycles or news to be captured in a week.

Although the present invention has been described above with reference to the specific embodiment, the present invention is not limited to such specific embodiment. For example, the computer 10, the communication unit 27 and other elements illustrated in FIG. 1 may be incorporated into the robot 31 or may be placed some other place.

The present invention provides development possibility and surprise to conversation as priority can be flexibly changed and because the system includes not only the general conversation database 15a but also news database 13 and random chat database 15c. Even if the user does not have a positive intention to search information, the system may provide chats selected from the random chat database 15c or most recent news so that conversation with the user may continue without placing a load to the user.

As the humanoid robot is used, the user may feel close to the robot and may enjoy a natural conversation.

What is claimed is:

1. A chat information system having a voice recognition device for recognizing voices, a voice synthesizer, a humanoid robot, a microphone for receiving the voices and a speaker for pronouncing synthesized voices, comprising:

news capturing means for capturing news from the Internet;

a news database for storing the captured news as a news reply, wherein the news reply has a plurality of priorities;

a conversation database including at least a general conversation database storing a set of inquires and responses as conversation replies and a random chat database storing a plurality of predetermined responses, wherein a conversation reply has a plurality of priorities and at least one of the conversation replies belongs to one of a plurality of predetermined chat patterns; and a chat engine configured to:

extract one or more keywords from a user's speech that has been recognized by the voice recognition device;

determine whether a reserved chat flag associated with the extracted keywords is set, the reserved chat flag being set responsive to the extracted keywords belonging to one of the predetermined chat patterns;

responsive to the reserved chat flag being set, setting a reply to a predetermined response of the plurality of the predetermined responses or a predetermined chat pattern of the plurality of the chat patterns;

responsive to the reserved chat flag not being set, search at least one of the news database, the conversation database, and responsive to no matching being found from at least one of the news database and the conversation database, search the random chat database with the extracted keywords;

select the reply among a plurality of replies found by the search based on the priorities of the replies;

update the plurality of priorities associated with the replies; and output via the speaker the reply.

2. The system of claim 1, wherein the chat engine includes priority changing means for lowering the priority of the reply that has been found by the search and has been output as a response relative to the other replies.

3. The system as claimed in claim 2, wherein the chat engine searches at least one of said news database and the conversation database with a plurality of words included in a user's speech, and when a plurality of replies are found wherein each of the replies has at least one or more words matching the words included in the user's speech, selects and outputs one of the replies based on matching degree of the replies with the plurality of words and on said priorities assigned to the replies.

4. The system of claim 1, wherein said conversation database includes a word conversion database.

5. The system of claim 1, wherein said news capturing means includes a headline sensor capturing most recent news at a predetermined time interval, and wherein said news database updates its replies based on input from the headline sensor.

6. The system of claim 1, wherein setting a reply to a predetermined response comprises outputting a response according to said chat pattern responsive to a user's speech.

7. The system of claim 1, wherein the reply is a captured news that has at least one or more words matching the extracted keywords of the user's speech.

8. The system of claim 1, wherein the reply is a response from the conversation database, and wherein the corresponding inquiry of the response has at least one or more words matching the extracted keywords of the user's speech.

9. The system of claim 1, wherein the plurality of priorities of the news reply include a prior priority and a current priority.

10. The system of claim 1, wherein the news reply further comprises an individual variation of priority and a total variation of priority.

11. The system of claim 1, wherein the plurality of priorities of the conversation reply include a prior priority and a current priority.

12. The system of claim 1, wherein the conversation reply further comprises a variation of priority.

* * * * *

UNITED STATES PATENT AND TRADEMARK OFFICE
CERTIFICATE OF CORRECTION

| | |
|---|---|
| PATENT NO. | : 7,711,569 B2 |
| APPLICATION NO. | : 11/291551 |
| DATED | : May 4, 2010 |
| INVENTOR(S) | : Johane Takeuchi and Atsushi Hoshino |

It is certified that error appears in the above-identified patent and that said Letters Patent is hereby corrected as shown below:

On the title page, item [75] under Inventors, replace "Yohane Takeuchi" with --Johane Takeuchi--.

Signed and Sealed this

Thirteenth Day of July, 2010

David J. Kappos
*Director of the United States Patent and Trademark Office*